US012668456B2

(12) United States Patent
Li et al.

(10) Patent No.: US 12,668,456 B2
(45) Date of Patent: Jun. 30, 2026

(54) METHOD FOR INDICATING ELEVATOR SERVICE STATUS AND ELEVATOR CALL DEVICE

(71) Applicant: Otis Elevator Company, Farmington, CT (US)

(72) Inventors: Zhe Li, Shanghai (CN); Sisi Zheng, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 892 days.

(21) Appl. No.: 17/991,305

(22) Filed: Nov. 21, 2022

(65) Prior Publication Data

US 2023/0312304 A1 Oct. 5, 2023

(30) Foreign Application Priority Data

Mar. 30, 2022 (CN) ......................... 202210323808.8

(51) Int. Cl.
*B66B 1/46* (2006.01)
*B66B 1/34* (2006.01)
*B66B 3/00* (2006.01)

(52) U.S. Cl.
CPC ............ *B66B 1/468* (2013.01); *B66B 1/3461* (2013.01); *B66B 3/002* (2013.01); *B66B 2201/102* (2013.01); *B66B 2201/463* (2013.01)

(58) Field of Classification Search
CPC ........ B66B 2201/463; B66B 2201/102; B66B 3/002; B66B 1/468; B66B 2201/4607; B66B 1/3461; B66B 1/46
(Continued)

(56) References Cited

U.S. PATENT DOCUMENTS 4,600,087 A * 7/1986 Tsuji ........................ B66B 1/462
187/382
2017/0103633 A1* 4/2017 Khire ................... G08B 17/125
(Continued)

FOREIGN PATENT DOCUMENTS

CN 107814282 A 3/2018

OTHER PUBLICATIONS

Yamada (JP 2006193227 A)Landing Device for Elevator and Lighting Method of Its Landing Button (Year: 2006).*
(Continued)

*Primary Examiner* — Jorge L Carrasquillo
(74) *Attorney, Agent, or Firm* — CANTOR COLBURN LLP

(57) ABSTRACT

A method for indicating a service status of an elevator, an elevator call-out device, and a computer-readable storage medium. Elevator call-out device includes a call-out button for inputting a request to cause an elevator car to move relative to a landing station where the elevator call-out device is located; a visual sign associated with a direction of movement of the elevator car indicated by the call-out button; a control unit configured to: switch the corresponding visual sign from an off state to a normally lit state upon receiving the request to cause the elevator car to move relative to the landing station where the elevator call-out device is located; switch the visual sign corresponding to the direction of movement of the elevator car after stopping to a flashing state in response to an event that the elevator car stops at the landing station where the elevator call-out device is located.

23 Claims, 8 Drawing Sheets

(58) Field of Classification Search
USPC .......................................................... 187/395
See application file for complete search history.

(56) References Cited

U.S. PATENT DOCUMENTS

| | | | | |
|---|---|---|---|---|
| 2018/0022572 | A1 | 1/2018 | Taniyama | |
| 2023/0150795 | A1 * | 5/2023 | Walther .................. | B66B 3/002<br>187/389 |

OTHER PUBLICATIONS

Wu (CN 107814282 A) The Elevator Button Panel And Display Method Thereof (Year: 2018).*
European Search Report for Application No. 22209475.7, Issued Aug. 11, 2023, 8 Pages.

* cited by examiner

METHOD FOR INDICATING ELEVATOR SERVICE STATUS AND ELEVATOR CALL DEVICE

FOREIGN PRIORITY

This application claims priority to Chinese Patent Application No. 202210323808.8, filed Mar. 30, 2022, and all the benefits accruing therefrom under 35 U.S.C. § 119, the contents of which in its entirety are herein incorporated by reference.

TECHNICAL FIELD

The present application relates to elevator technology, in particular to a method for indicating a service status of an elevator, an elevator call-out device for implementing the method, and a computer-readable storage medium.

BACKGROUND

A request to stop at a waiting floor can be sent to an elevator system by pressing an elevator call-out button installed near a landing door of an elevator. An elevator call-out panel usually contains two call-out buttons that request an elevator car to move up and down. Information received by an elevator controller from the call-out panel includes not only a floor to stop, but also a direction of movement of the elevator car required by a user after stopping at the floor.

SUMMARY

According to an aspect of the present application, there is provided an elevator call-out device, comprising: a call-out button for inputting a request to cause an elevator car to move upward and downward relative to a landing station where the elevator call-out device is located; a visual sign associated with a direction of movement of the elevator car indicated by the call-out button; a control unit configured to:

upon receiving the request input via the call-out button to cause the elevator car to move upward or downward relative to the landing station where the elevator call-out device is located, switch one of the visual signs, which corresponds to the requested direction of movement, from an off state to a normally lit state; in response to an event that the elevator car stops at the landing station where the elevator call-out device is located, switch one of the visual signs, which corresponds to a direction of movement of the elevator car in which the elevator car will move after stopping, from the normally lit state to a flashing state; and in response to an event that a door of the elevator car or a door of the landing station where the elevator call-out device is located is closed, switch one of the visual signs in the flashing state to the off state.

Optionally, in the above elevator call-out device, the control unit is further configured to: receive a command from an external device which indicates the visual signs switched from the off state to the normally lit state; switch the visual signs indicated by the command from the off state to the normally lit state.

Optionally, in the above elevator call-out device, the visual signs are one or more of the following items: call-out button indicator, arrival indicator, and upward and downward markers displayed on a display screen.

Optionally, in the above elevator call-out device, the control unit is configured to switch one of the visual signs from the normally lit state to the flashing state in the following manner receiving an indication signal from an elevator controller that the elevator car stops at the landing station where the elevator call-out device is located; causing a luminous intensity of one of the visual signs, which corresponds to the direction of movement of the elevator car in which the elevator car will move after stopping, to change within a set range.

Optionally, in the above elevator call-out device, the control unit is configured to switch one of the visual signs from the normally lit state to the flashing state in the following manner receiving an indication signal from an elevator controller that the door of the landing station where the elevator call-out device is located is opened or that the door of the elevator car is opened after arriving at the landing station where the elevator call-out device is located; causing a luminous intensity of one of the visual signs, which corresponds to the direction of movement of the elevator car in which the elevator car will move after stopping, to change within a set range.

Optionally, in the above elevator call-out device, the control unit is further configured to switch one of the visual signs from the normally lit state to the flashing state in the following manner receiving an indication signal from an elevator controller that the elevator car stops at the landing station where the elevator call-out device is located; causing a color of one of the visual signs, which corresponds to the direction of movement of the elevator car in which the elevator car will move after stopping, to change alternately.

Optionally, in the above elevator call-out device, the control unit is further configured to switch one of the visual signs from the normally lit state to the flashing state in the following manner receiving an indication signal from an elevator controller that the door of the landing station where the elevator call-out device is located is opened or that the door of the elevator car is opened after arriving at the landing station where the elevator call-out device is located; causing one of the visual signs, which corresponds to the direction of movement of the elevator car in which the elevator will move after stopping, to change alternately.

Optionally, in the above elevator call-out device, the control unit is configured to switch one of the visual signs from the flashing state to the off state in the following manner receiving an indication signal from an elevator controller that the door of the elevator car or the door of the landing station where the elevator call-out device is located is closed; causing one of the visual signs, which corresponds to the direction of movement of the elevator car in which the elevator car will move after stopping, to enter the off state.

Optionally, in the above elevator call-out device, the control unit is configured to switch one of the visual signs from the off state to the normally lit state in the following manner detecting whether the call-out button is pressed or whether an object hovers in its vicinity; if it is detected that the call-out button is pressed or the object hovers in its vicinity, one of the visual signs, which corresponds to the direction of movement indicated by the call-out button, is caused to enter the normally lit state.

Optionally, the elevator call-out device is an integrated call-out panel assembly or a discrete call-out panel assembly.

Optionally, in the above elevator call-out device, a frequency value within a normal range of respiratory frequency is determined as the luminous intensity or frequency of color change of the visual sign.

According to another aspect of the present application, there is provided an elevator system, comprising: an elevator car; an elevator controller; and a plurality of elevator call-out devices as described above, each being provided at a corresponding landing station.

According to another aspect of the present application, there is provided a method for indicating a service status of an elevator, comprising: upon receiving the request input via the call-out button to cause the elevator car to move upward or downward relative to the landing station where the elevator call-out device is located, switching one of the visual signs, which corresponds to the requested direction of movement, from an off state to a normally lit state; B. in response to an event that the elevator car stops at the landing station where the elevator call-out device is located, switching one of the visual signs, which corresponds to a direction of movement of the elevator car in which the elevator car will move after stopping, from the normally lit state to a flashing state; and C. in response to an event that a door of the elevator car or a door of the landing station where the elevator call-out device is located is closed, switching one of the visual signs in the flashing state to the off state.

According to another aspect of the present application, there is provided a computer-readable storage medium in which an instruction is stored. When the instruction is executed by a processor, the processor is caused to execute the above method.

DESCRIPTION OF THE DRAWINGS

The above and/or other aspects and advantages of the present application will be clearer and more easily understood from the following description of various aspects in conjunction with the accompanying drawings, in which the same or similar elements are specified by the same reference numerals. The accompanying drawings include.

DETAILED DESCRIPTION

The following detailed description is only illustrative in nature and is not intended to limit the present application or applications and uses of the present application. Many specific details are set forth in the following description of the specific embodiments of the application in order to provide a more in-depth understanding of the application. However, for those of ordinary skill in the art, the application can still be practiced without providing these specific details. In some examples, well-known features are omitted to avoid complicating the description.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

Figure 1:
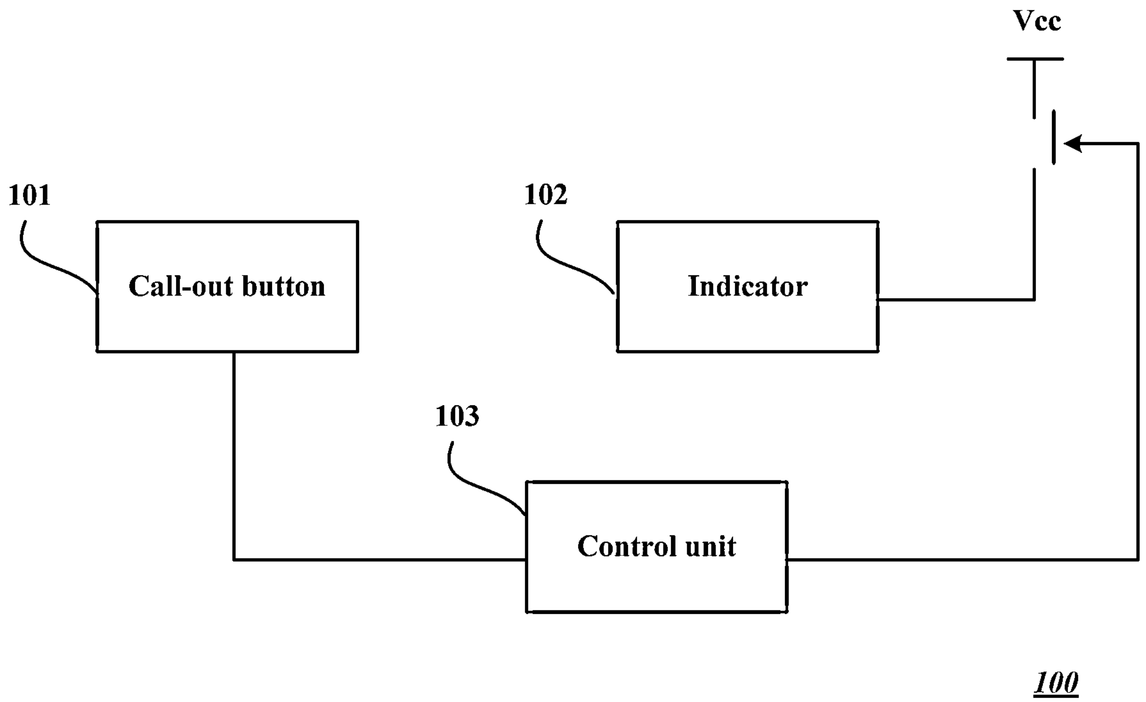
FIG. 1 is a schematic block diagram of a typical elevator call-out device.

FIG. 1 is a schematic block diagram of a typical elevator call-out device.

An elevator call-out device 100 shown in FIG. 1 includes a call-out button 101, a button indicator 102, and a control unit 103. Control unit 103 may be implemented using a general-purpose microprocessor executing a computer program stored on a storage medium to perform the operations described herein. Alternatively, control unit 103 may be implemented in hardware (e.g., ASIC, FPGA) or in a combination of hardware/software. Control unit 20 may also be part of an elevator control system.

Figure 2A:
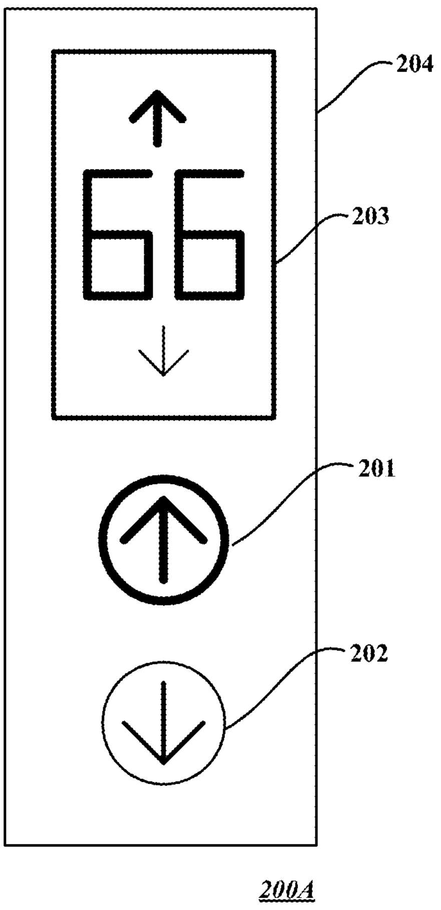
FIG. 2A is an exemplary schematic diagram of an integrated call-out panel assembly.

The elevator call-out device 100 may take the form of an integrated call-out panel assembly as shown in FIG. 2A, for example. The call-out panel assembly 200A shown in FIG. 2A is usually installed on one side of a landing door of an elevator, and buttons 201, 202 corresponding to "upward" and "downward" directions and display screen 203 displaying information such as a current floor of an elevator car are arranged on a surface of a panel 204, and button indicators (not shown) are arranged behind the buttons 201 and 202. When a user touches or presses the corresponding button, the corresponding button indicator is illuminated to indicate a direction of elevator movement requested by the user. The display screen 203 is used to display information about the current floor of the elevator car, to display a direction in which the elevator car arrives at the current floor or the elevator car is moving or will move (shown in the figure with thick solid arrows for example).

Figure 2B:
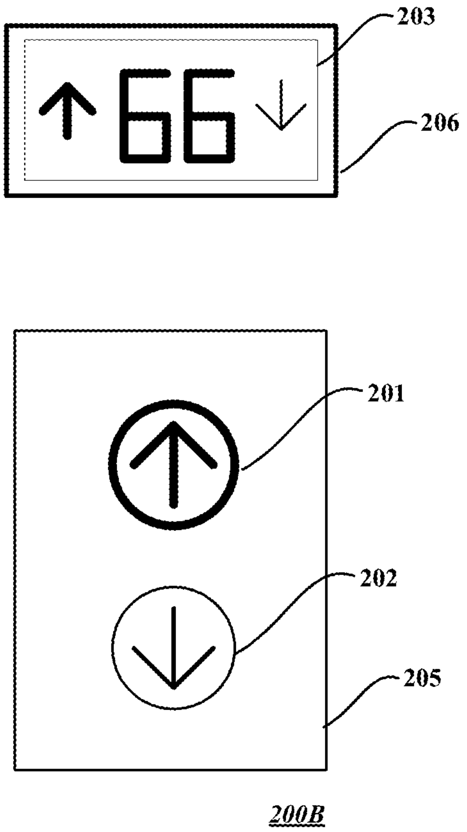
FIG. 2B is an exemplary schematic diagram of a discrete call-out panel assembly.

The elevator call-out device 100 may also take the form of a discrete call-out panel assembly as shown in FIG. 2B, for example. The call-out panel assembly 200B shown in FIG. 2B includes a first panel 205 and a second panel 206, which are installed, for example, on one side of the landing door of the elevator and above the landing door, respectively. Buttons 201, 202 corresponding to the "upward" and "downward" directions are arranged on the surface of the first panel 205, and button indicators (not shown) are arranged behind the buttons 201, 202. The display screen 203 is arranged on the surface of the second panel 206 to display information about the current floor of the elevator car, to display prompt information of a direction in which the elevator car arrives at the current floor or the elevator car is moving or will move (shown in the figure with thick solid arrows for example). Similarly, when a user touches or presses the corresponding button, the corresponding button indicator is illuminated to indicate a direction of elevator operation requested by the user.

It should be noted that the pressed call-out buttons shown in FIGS. 2A and 2B can also be replaced by non-contact buttons, which may operate, for example, based on the principle of capacitive sensing, i.e., when there is an object hovering near the non-contact button, the capacitance can change. Therefore, it can be determined that a call-out request is input based on the change in capacitance.

In the elevator call-out device 100 shown in FIG. 1, when the call-out button 101 (e.g., buttons 201, 202 in FIGS. 2A and 2B) is pressed or an object hovers near the call-out button 101, the control unit 103 will detect this change in state. Exemplarily, the press of the call-out button or the presence of a hovering object will cause a loop to be closed, thereby generating a trigger signal at the control unit 103 (for example, a chip I/O port used to implement the control unit function is connected to the loop, so a high-level signal will be applied on the I/O port). In response to the trigger signal, the control unit 103 will perform corresponding operations, such as lighting the indicator or button by turning on the power supply Vcc of the indicator corresponding to the pressed button or the button with a hovering object nearby.

The control unit 103 may control the status of the indicator based on the following control logic: in response to an indication signal, for example, from an elevator controller or an elevator control cabinet 110 that the elevator car arrives at the landing station or floor where the elevator call-out device 100 is located, the indicator is turned off by disconnecting the indicator corresponding to the direction of movement of the elevator car, in which the car will move after stopping, from the power supply Vcc.

Figure 3A:
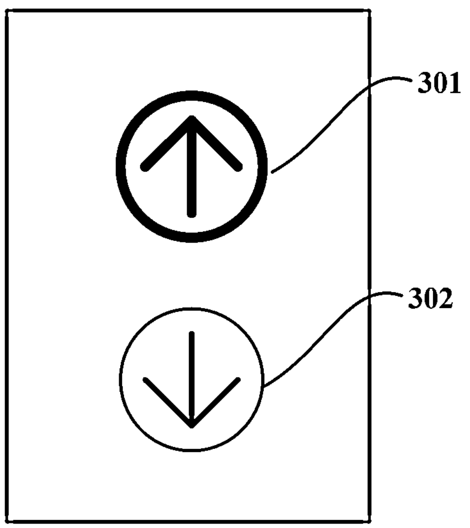
FIGS. 3A and 3B show an example of status of indicators before and after an elevator car arrives at a floor where an elevator call-out device is located, respectively.
Figure 3B:
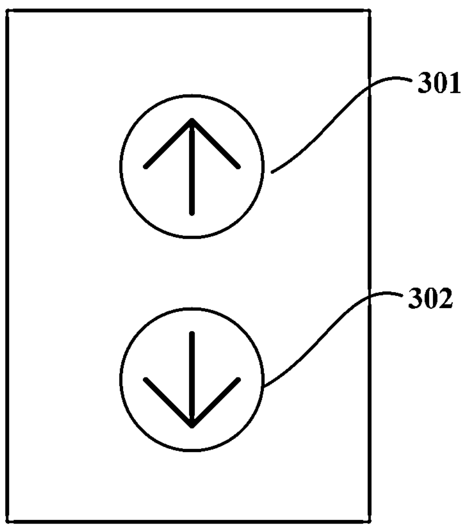

FIGS. 3A and 3B show an example of status of indicators before and after an elevator car arrives at a floor where an elevator call-out device is located, respectively. Referring to FIG. 3A, it is assumed that the button in the "upward" direction is pressed, so under the control of control unit 103, the indicator 301 corresponding to the upward direction is lit (indicated by a thick solid circle) and the indicator 302 corresponding to the downward direction (indicated by a thin solid circle) is in the off state. When the elevator car arrives at the floor where the elevator call-out device is located, as shown in FIG. 3B, under the control of control unit 103, the indicator 301 corresponding to the upward direction is off and the indicator 302 corresponding to the downward direction remains in the off state. Subsequently, after a passenger enters the car and presses the floor to be reached upward, a door of the elevator car and a landing door will be closed and the elevator car will move upward. In the examples shown in FIGS. 3A and 3B, information about the service status of the elevator provided by the status of the indicator is incomplete. In particular, it is impossible to judge the direction of movement of the elevator car after stopping based only on the information that the door of the elevator car is open and the "upward" and "downward" indicators are all off. Therefore, for a passenger who does not know the status of the indicators before the car stops, it is impossible to determine whether he or she should take the elevator that is currently stopped.

Figure 4A:
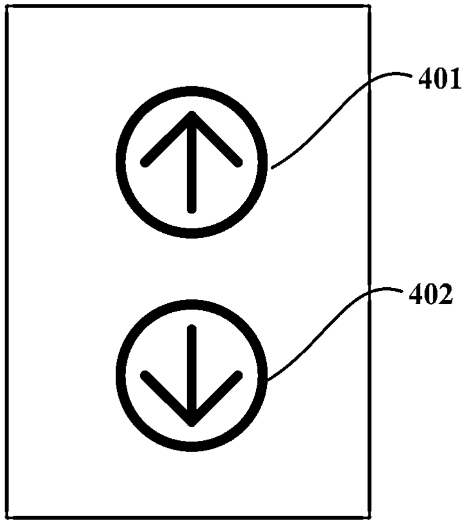
FIGS. 4A and 4B show another example of status of indicators before and after an elevator car arrives at a floor where an elevator call-out device is located, respectively.
Figure 4B:
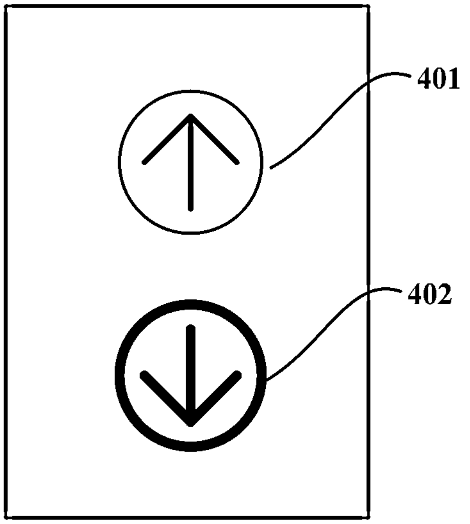

FIGS. 4A and 4B show another example of status of indicators before and after an elevator car arrives at a floor where an elevator call-out device is located, respectively. In this example, it is assumed that the buttons in the "upward" and "downward" directions are pressed, so under the control of control unit 103, both indicators 401 and 402 are lit (indicated by thick solid circles) as shown in FIG. 4A. Assuming that the elevator car will continue to move upward after stopping according to a dispatching command of the elevator controller, when the elevator car arrives at the floor where the elevator call-out device is located, under the control of control unit 103, as shown in FIG. 4B, the indicator 401 corresponding to the upward direction will be off (indicating that a upward call request is satisfied), while the indicator corresponding to the downward direction remains in the normally lit state (indicating that a downward call request is not yet satisfied). Subsequently, after a passenger enters the car and presses the floor to be reached upward, a door of the elevator car and a landing door will be closed and the elevator car will move upward. In the examples shown in FIGS. 4A and 4B, the service status of the elevator indicated by the status of the indicator may be misinterpreted. Specifically, the inventors of the application found through psychological experiments that in the case shown in FIG. 4B, many people would subconsciously or instinctively believe that the indicator in the normally lit state represents the direction of movement of the elevator car after stopping, and thus mistakenly take an elevator that moves in the direction away from their target floor. On the other hand, in the examples of FIGS. 4A and 4B, if the control logic is changed so that the indicator corresponding to the direction of movement of the elevator car after stopping is kept in the normally lit state while the other indicator is off, it will result in the loss of information about the service status of the elevator. Taking the examples shown in FIGS. 4A and 4B as an example, according to the modified control logic, the indicator 401 representing the "upward" direction remains in the normally lit state to prompt that the elevator car will move upward subsequently. However, since the indicator 402 representing the "downward" direction is off, it is impossible to distinguish between the state where the downward call request is not yet satisfied and the state where the downward call request does not exist, thus bringing inconvenience and trouble to the relevant passengers.

In order to solve the above difficulties, in some embodiments of the present application, the control unit adopts the following improved control logic:

in response to an event that the elevator car stops at the landing station or floor where the elevator call-out device is located, the indicator corresponding to the direction of movement of the elevator car in which the car will move after stopping is caused into the flashing state (for example, by causing the indicator to be periodically powered on or by continuously supplying power to the indicator with a changing current or voltage), and in response to an event that the door of the elevator car or the door of the landing station where the elevator call-out device is located is closed, the indicator of the call-out button corresponding to the direction of movement of the elevator car in which the car will move after stopping is caused to be switched from the flashing state to the off state.

That is, in these embodiments of the present application, the flashing state indicates the service status of the elevator in which a call request in a certain direction (upward or downward) is being satisfied, the normally lit state indicates the service status of the elevator in which a call request in a certain direction (upward or downward) is not yet satisfied, and the off state indicates the service status of the elevator in which no call request in a certain direction (upward or downward) exists.

It should be pointed out that various ways may be used to notify the control unit of an event that the elevator car stops at the landing station where the elevator call-out device is located. In one exemplary way, an indication signal that the elevator car stops at the landing station where the elevator call-out device is located may be sent to the control unit of the elevator call-out device by an external device such as an elevator controller or an elevator control cabinet. In another exemplary way, an indication signal that the door of the landing station where the elevator call-out device is located is opened or that the door of the elevator car is opened after arriving at the landing station where the elevator call-out device is located may be sent to the control unit of the elevator call-out device by an external device such as an elevator controller or an elevator control cabinet. The indication signal described here should be broadly understood as not only including the signals that directly indicate the elevator car stops at the landing station, the door of the elevator car and the landing door are closed (such as the status signals sent by the elevator controller to indicate the opening and closing status of the car door, etc.), but also including the signals that indirectly indicate the elevator car stops at the landing station, the door of the elevator car and the landing door are closed (such as the command to turn off the indicator sent by the elevator controller to the elevator call-out device).

The above improved control logic is further described below with the help of the drawings.

Figure 5A:
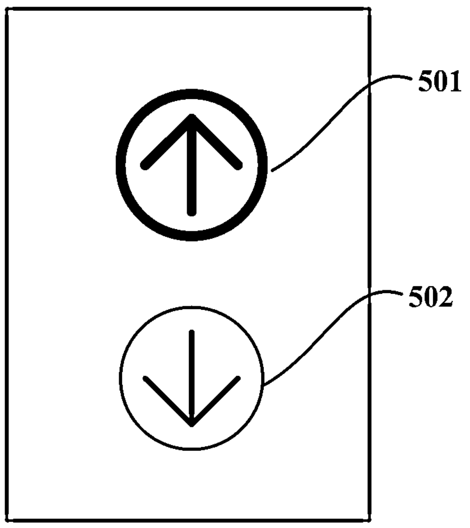
FIGS. 5A and 5B show another example of status of indicators before and after an elevator car arrives at a floor where an elevator call-out device is located, respectively.
Figure 5B:
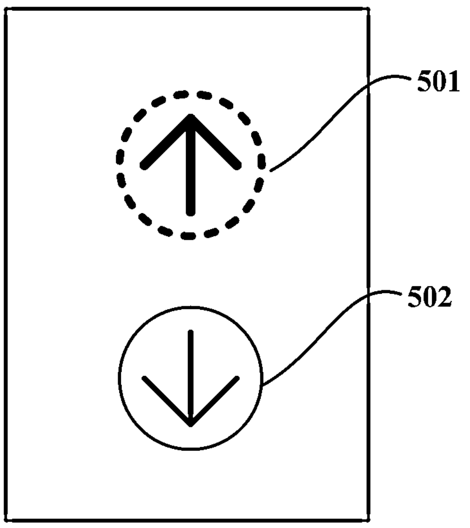

FIGS. 5A and 5B show another example of status of indicators before and after an elevator car arrives at a floor where an elevator call-out device is located, respectively. Referring to FIG. 5A, similar to FIG. 3A, it is assumed that the button in the "upward" direction is pressed, so the indicator 501 corresponding to the upward direction is lit (indicated by a thick solid circle) and the indicator 502 corresponding to the downward direction is in the off state. Then referring to FIG. 5B, when the elevator car arrives at the floor where the elevator call-out device is located, although the indicator 502 remains in the off state, unlike the status of the indicator shown in FIG. 3B, in FIG. 5B, under the control of control unit 103, the indicator 501 corresponding to the upward direction goes into a flashing state (indicated by a dashed circle). Subsequently, after a passenger enters the car and presses the floor to be reached upward, a door of the elevator car and a landing door will be closed and the elevator car will move upward. At this time, the indicator 501 will be switched from the flashing state to the off state.

Figure 6A:
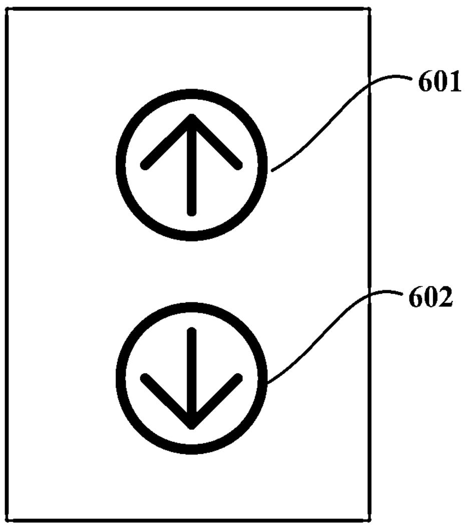
FIGS. 6A and 6B show another example of status of indicators before and after an elevator car arrives at a floor where an elevator call-out device is located, respectively.
Figure 6B:
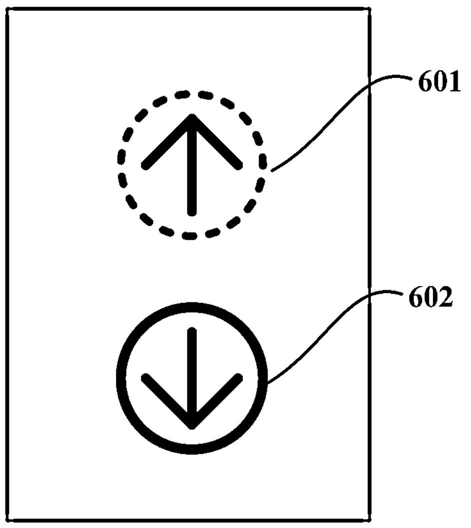

FIGS. 6A and 6B show another example of status of indicators before and after an elevator car arrives at a floor where an elevator call-out device is located, respectively. Referring to FIG. 6A, in this example, similar to FIG. 4A, it is assumed that both buttons in the "upward" and "downward" directions are pressed, and thus the two indicators 601 and 602, representing the "upward" and "downward" directions, are both lit (indicated by the thick solid circles). Then referring to FIG. 6B, assuming that the elevator car will continue to move upward after stopping, when the elevator car arrives at the floor where the elevator call-out device is located, although the indicator 602 corresponding to the downward direction remains in the normally lit state to indicate that a downward call request is not yet satisfied, unlike the one shown in FIG. 4B, in FIG. 6B, the indicator 601 corresponding to the upward direction will enter the flashing state to indicate that the upward call request is being satisfied. Subsequently, after a passenger enters the car and presses the floor to be reached upward, a door of the elevator car and a landing door will be closed and the elevator car will move upward. At this time, the indicator 601 will be switched from the flashing state to the off state.

As seen from the examples described above with the help of FIGS. 5A, 5B, 6A and 6B, by introducing the flashing state for the indicator, it is possible to present information about the service status of the elevator in a complete manner while making the form of information presentation more suitable for the habits of passengers. Since the above control logic improvements can be implemented without changing the hardware structure of the elevator call-out device and such improvements do not substantially increase the complexity of the control logic, it has the advantages of low development difficulty, strong universality, and low cost for upgrading the existing elevator system. For example, in one example, in the control logic of the prior art, when an elevator car stops at the landing station, the elevator controller will send a command to the elevator call-out device to bring the visual sign corresponding to the direction of movement of the car after stopping into an off state. When this command is interpreted as an indication signal that the elevator car stops at the landing station where the elevator call-out device is located, the improved control logic described above can be implemented without changing the control logic on the elevator controller side.

It should be noted that the call-out button indicator is only one example of a visual sign used to indicate the direction of elevator movement. Those skilled in the art will recognize, after reading the content described in the Description, that the above improved control logic is also suitable for other visual signs used to indicate the direction of elevator car movement. Other examples of visual signs include, but are not limited to, arrival indicator and upward and downward markers displayed on the display screen (e.g., arrow markers displayed on the display screen 203 of FIGS. 2A and 2B), etc.

It is also should be noted that the flashing state described herein should be broadly understood as a state in which the visual sign provides a dynamic display effect. In some embodiments, this dynamic display effect may be presented by a variation of the luminous intensity of the visual sign within a set range (e.g., 30%-100% of the maximum luminous intensity), which may be achieved, for example, by providing a changing current or voltage to the indicator of the call-out button. In other embodiments, the dynamic display effect is reflected as a variation in the color of the visual signs, such as the alternate illumination of a plurality of indicators with different colors (which all correspond to the same call-out button).

Although respiratory frequency varies with age, gender and physiological state, there is usually a normal range for a large number of individuals. The inventors of the present application have found through research that when the luminous intensity or frequency of color change of the visual sign is set within the normal range of respiratory frequency (e.g., 12-20 times/minute), it can significantly improve the subject's attention to the visual sign without causing discomfort to the subject.

Figure 7:
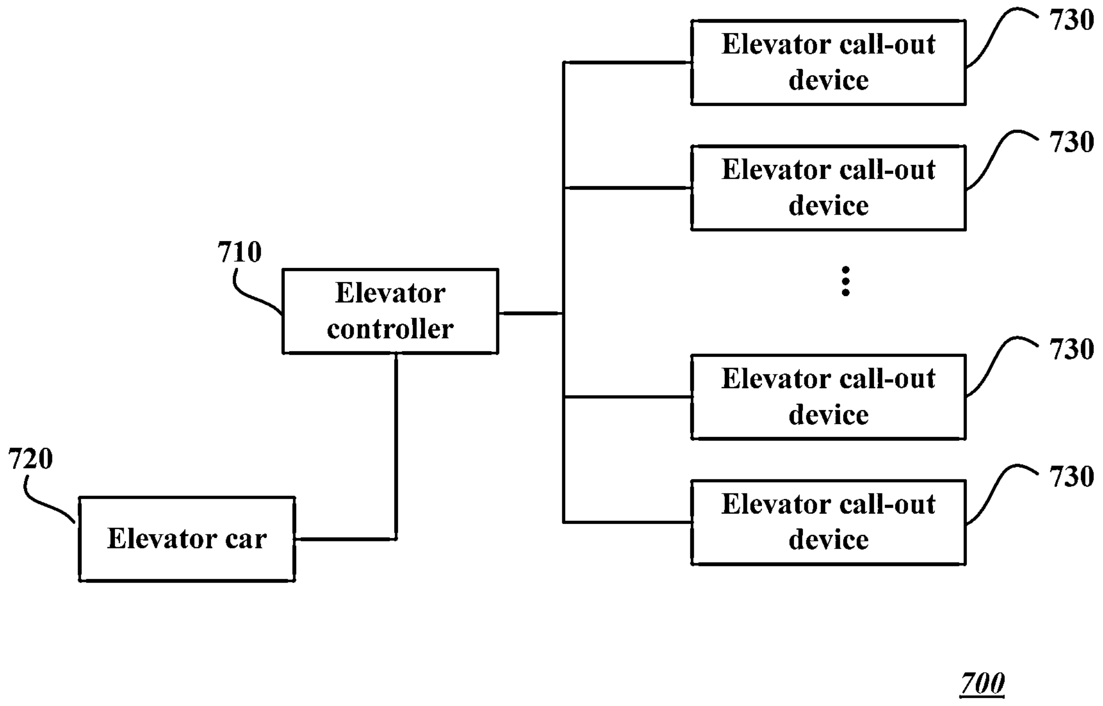
FIG. 7 is a schematic block diagram of a typical elevator system.

FIG. 7 is a schematic block diagram of a typical elevator system.

Referring to FIG. 7, an elevator system 700 includes an elevator controller 710, an elevator car 720, and a plurality of elevator call-out devices 730 (e.g., call buttons, touch-screen, etc.). Each elevator call-out device is provided at the corresponding landing station or floor to receive the user's call request and display service status of the elevator. The elevator controller 710 generates operation instructions for the elevator car based on the call requests received from the elevator call-out devices 730. In the elevator system shown in FIG. 7, the elevator call-out devices 730 may have various structures and features of the embodiments of the present application described above with the help of the accompanying drawings, in particular, the control units of the elevator call-out devices use the improved control logic described above to indicate the service status of the elevator. Elevator controller 710 may be implemented using a general-purpose microprocessor executing a computer program stored on a storage medium to perform the operations described herein.

Alternatively, elevator controller 710 may be implemented in hardware (e.g., ASIC, FPGA) or in a combination of hardware/software.

Figure 8:
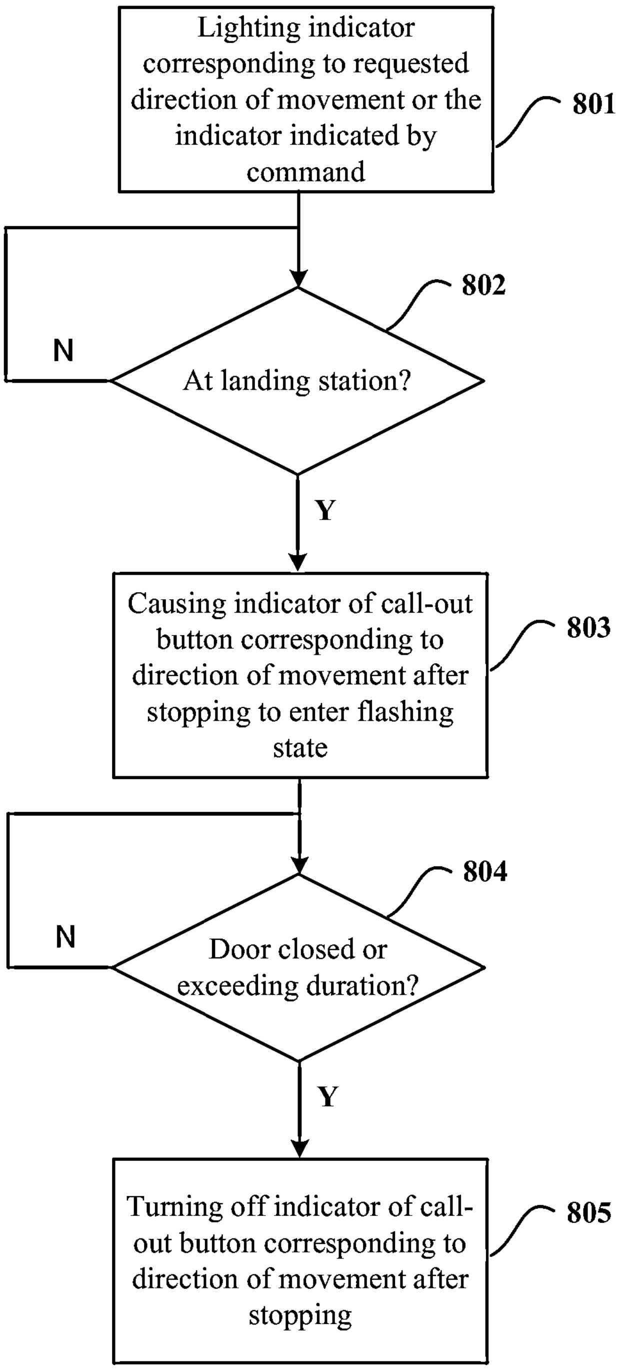
FIG. 8 is a flowchart of a method for indicating a service status of an elevator in accordance with some embodiments of the present application.

FIG. 8 is a flowchart of a method for indicating a service status of an elevator in accordance with some embodiments of the present application. Exemplarily, each step of the method shown in FIG. 8 is described below using the elevator call-out device shown in FIG. 1 as an example.

The method shown in FIG. 8 includes the following steps:

Step 801: The control unit 103 of the elevator call-out device 100, upon receiving a request to make the elevator car move upward or downward relative to the landing station where the elevator call-out device is located, causes the indicator of the call-out button corresponding to the requested direction of movement to enter a normally lit state. For example, if a request for upward movement is received, the control unit 103 causes the indicator corresponding to upward movement to be in the normally lit state.

The control unit 103 may determine whether a request is received and the type of request (upward movement or downward movement) based on the state of the call-out button 101 (e.g., buttons 201 and 202). Exemplarily, when the call-out button is pressed or an object is hovered near the call-out button, a trigger signal is generated at the control unit 103 (e.g., a high level signal is applied to the I/O port of the chip used to implement the control unit function), whereby the control unit 103 may determine the presence and type of the request and light the corresponding indicator by turning on the power supply Vcc.

Optionally, in step 801, the visual sign (e.g., indicator of the call-out button) may also be brought into the normally lit state in the following manner. The control unit 103 first receives a command from a device (e.g., an elevator controller) located outside the elevator call-out device that indicates the indicator to be switched to the normally lit state; the control unit 103 then switches the indicator indicated by the command from the off state to the normally lit state (e.g., by turning on the power supply Vcc to light the indicator). This approach can be applied, for example, in the following application scenario: a passenger sends a call request via a personal terminal device such as a cell phone, a smart watch and smart glasses, and a device located outside the elevator call-out device (such as an elevator controller) receives the call request and generates a corresponding control command to control the operation of the elevator car and instructs the elevator call-out device to present the corresponding information about the service status of the elevator.

Step 802: The control unit 103 judges whether there is an event that the elevator car stops at the landing station where the elevator call-out device 100 is located. If it exists, it proceeds to step 803, otherwise it continues to perform the judgment operation.

As mentioned above, various ways may be used to notify the control unit of an event that the elevator car stops at the landing station where the elevator call-out device is located. For example, an indication signal that the elevator car stops at the landing station where the elevator call-out device is located or an indication signal that the door of the landing station where the elevator call-out device is located is opened or that the door of the elevator car is opened after arriving at the landing station may be sent to the control unit of the elevator call-out device by an elevator controller or an elevator control cabinet.

Step 803: The control unit 103 causes the indicator of the call-out button corresponding to the direction of movement of the elevator car, in which the car will move after stopping, to enter a flashing state. For example, in the examples shown in FIGS. 5A and 5B, under the control of control unit 103, the indicator 502 corresponding to the downward direction remains in the off state while the indicator 501 corresponding to the upward direction enters the flashing state. In the examples shown in FIGS. 6A and 6B, under the control of control unit 103, the indicator 602 corresponding to the downward direction remains in the normally lit state while the indicator 601 corresponding to the upward direction will enter the flashing state. After executing step 803, the process shown in FIG. 8 will proceed to step 804.

As described above, the flashing state can be achieved by providing a changing current or voltage to the indicator of the call-out button, or by lighting a plurality of indicators with different colors (which all correspond to the same call-out button) alternately. In addition, the luminous intensity or frequency of color change of the indicator can be set within the normal range of respiratory frequency to improve the passenger's attention to the indicator without causing discomfort.

Step 804: The control unit 103 judges whether there is an event that the door of the elevator car or the door of the landing station where the elevator out-call device is located is closed. If it exists, it proceeds to step 805, otherwise it continues to perform the judgment operation. Various ways may be used to notify the control unit of an event that the door of the elevator car or the door of the landing station where the elevator call-out device is located is closed, such as the elevator controller or the elevator control cabinet sending an indication signal to the control unit that the door of the elevator car or the door of the landing station is closed.

In this step, it is also possible to replace the above judgment with a judgment of whether the stay of the elevator car at the landing station where the elevator call-out device 100 is located exceeds a preset duration. If it exceeds, it proceeds to step 805, otherwise, it continues to wait.

Step 805: The control unit 103 causes the indicator of the call-out button corresponding to the direction of movement of the elevator car after stopping switch from the flashing state to the off state. For example, in the examples shown in FIGS. 5A and 5B, the indicator 501 corresponding to the upward direction will switch to the off state under the control of control unit 103. In the examples shown in FIGS. 6A and 6B, for example, under the control of control unit 103, the indicator 602 corresponding to the downward direction remains in the normally lit state while the indicator 601 corresponding to the upward direction switches from the flashing state to the off state.

According to another aspect of the present application, there is also provided a computer-readable storage medium on which a computer program is stored. When the program is executed by the processor, one or more steps contained in the method described above with the help of FIG. 8 may be realized.

The computer-readable storage medium referred to in the application includes various types of computer storage media, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that may be used to carry or store a desired program code unit in the form of instructions or data structures and that may be accessed by a general-purpose or special-purpose computer or a general-purpose or special-purpose processor.

Disks as used herein usually copy data magnetically, while discs use lasers to optically copy data. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and embodiments shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. An elevator call-out device, comprising:

a call-out button for inputting a request to cause an elevator car to move upward or downward relative to a landing station where the elevator call-out device is located;

visual signs associated with directions of movement of the elevator car indicated by the call-out button;

a control unit configured to:

upon receiving the request input via the call-out button to cause the elevator car to move upward or downward relative to the landing station where the elevator call-out device is located, switch one of the visual signs, which corresponds to the requested direction of movement, from an off state to a normally lit state;

in response to the elevator car stopping at the landing station where the elevator call-out device is located, switch the one of the visual signs, which corresponds to a direction of movement of the elevator car in which the elevator car will move after stopping, from the normally lit state to a flashing state; and in response to a door of the elevator car closing or a door of the landing station where the elevator call-out device is closed closing, switch the one of the visual signs, which corresponds to the direction of movement of the elevator car in which the elevator car will move after stopping, from the flashing state to the off state;

wherein the flashing state is a state in which the one of the visual signs provides a dynamic display effect by varying the luminous intensity of the one of the visual signs within a set range or by varying a color of the one of the visual signs; and wherein a frequency of luminous intensity or color change of the one of the visual signs is set within the normal range of respiratory frequency.

2. The elevator call-out device of claim 1, wherein the control unit is further configured to:

receive a command from an external device which indicates the one of the visual signs from the off state to the normally lit state;

switch the one of the visual signs indicated by the command from the off state to the normally lit state.

3. The elevator call-out device of claim 1, wherein the one of the visual signs comprises at least one of: call-out button indicator, arrival indicator, and upward and downward markers displayed on a display screen.

4. The elevator call-out device of claim 1, wherein the control unit is configured to switch the one of the visual signs from the normally lit state to the flashing state by:

receiving an indication signal from an elevator controller that the elevator car stops at the landing station where the elevator call-out device is located;

causing a luminous intensity of the one of the visual signs, which corresponds to the direction of movement of the elevator car in which the elevator car will move after stopping, to change within a set range.

5. The elevator call-out device of claim 4, wherein a frequency value within a normal range of respiratory frequency is determined as the luminous intensity or frequency of color change of the visual sign.

6. The elevator call-out device of claim 1, wherein the control unit is configured to switch the one of the visual signs from the normally lit state to the flashing state by:

receiving an indication signal from an elevator controller that the door of the landing station where the elevator call-out device is located is opened or that the door of the elevator car is opened after arriving at the landing station where the elevator call-out device is located;

causing a luminous intensity of the one of the visual signs, which corresponds to the direction of movement of the elevator car in which the elevator car will move after stopping, to change within a set range.

7. The elevator call-out device of claim 1, wherein the control unit is further configured to switch the one of the visual signs from the normally lit state to the flashing state by:

receiving an indication signal from an elevator controller that the elevator car stops at the landing station where the elevator call-out device is located;

causing a color of the one of the visual signs, which corresponds to the direction of movement of the elevator car in which the elevator car will move after stopping, to change alternately.

8. The elevator call-out device of claim 1, wherein the control unit is further configured to switch the one of the visual signs from the normally lit state to the flashing state by:

receiving an indication signal from an elevator controller that the door of the landing station where the elevator call-out device is located is opened or that the door of the elevator car is opened after arriving at the landing station where the elevator call-out device is located;

causing the one of the visual signs, which corresponds to the direction of movement of the elevator car in which the elevator will move after stopping, to change alternately.

9. The elevator call-out device of claim 1, wherein the control unit is configured to switch the one of the visual signs from the normally lit state to the off state by:

receiving an indication signal from an elevator controller that the door of the elevator car or the door of the landing station where the elevator call-out device is located is closed;

causing the one of the visual signs, which corresponds to the direction of movement of the elevator car in which the elevator car will move after stopping, to enter the off state.

10. The elevator call-out device of claim 1, wherein the control unit is configured to switch the one of the visual signs from the off state to the normally lit state by:

detecting whether the call-out button is pressed or whether an object hovers in its vicinity;

if it is detected that the call-out button is pressed or the object hovers in its vicinity, the one of the visual signs, which corresponds to the direction of movement indicated by the call-out button, is caused to enter the normally lit state.

11. The elevator call-out device of claim 1, wherein the elevator call-out device is an integrated call-out panel assembly or a discrete call-out panel assembly.

12. An elevator system, comprising:

an elevator car;

an elevator controller; and a plurality of elevator call-out device of claim 1, each being provided at a corresponding landing station.

13. A method for indicating a service status of an elevator, comprising:

A. upon receiving the request input via the call-out button to cause the elevator car to move upward or downward relative to the landing station where the elevator call-out device is located, switching one of the visual signs, which corresponds to the requested direction of movement, from an off state to a normally lit state;

B. in response to the elevator car stopping at the landing station where the elevator call-out device is located, switching the one of the visual signs, which corresponds to a direction of movement of the elevator car in which the elevator car will move after stopping, from the normally lit state to a flashing state; and C. in response to a door of the elevator car closing or a door of the landing station where the elevator call-out device is located is closing, switching the one of the visual signs, which corresponds to the direction of movement of the elevator car in which the elevator car will move after stopping, from the flashing state to the off state;

wherein the flashing state is a state in which the visual sign provides a dynamic display effect by varying the luminous intensity of the one of the visual signs within a set range or by varying a color of the one of the visual signs; and wherein a frequency of luminous intensity or color change of the one of the visual signs is set within the normal range of respiratory frequency.

14. The method of claim 13, wherein further comprising:

D. receiving a command from an external device which indicates the one of the visual signs switched from the off state to the normally lit state;

E. switching the one of the visual signs indicated by the command from the off state to the normally lit state.

15. The method of claim 13, wherein the one of the visual signs comprises at least one of: call-out button indicator, arrival indicator, and upward and downward markers displayed on a display screen.

16. The method of claim 13, wherein step B comprises:

B1. receiving an indication signal from an elevator controller that the elevator car stops at the landing station where the elevator call-out device is located;

B2. causing a luminous intensity of the one of the visual signs, which corresponds to the direction of movement of the elevator car in which the elevator car will move after stopping, to change within a set range.

17. The method of claim 16, wherein a frequency value within a normal range of respiratory frequency is determined as the luminous intensity or frequency of color change of the one of the visual signs.

18. The method of claim 13, wherein step B comprises:

B1. receiving an indication signal from an elevator controller that the door of the landing station where the elevator call-out device is located is opened or that the door of the elevator car is opened after arriving at the landing station where the elevator call-out device is located;

B2. causing a luminous intensity of the one of the visual signs, which corresponds to the direction of movement of the elevator car in which the elevator car will move after stopping, to change within a set range.

19. The method of claim 13, wherein step B comprises:

B1. receiving an indication signal from an elevator controller that the elevator car stops at the landing station where the elevator call-out device is located;

B2. causing a color of the one of the visual signs, which corresponds to the direction of movement of the elevator car in which the elevator car will move after stopping, to change alternately.

20. The method of claim 13, wherein step B comprises:

B1. receiving an indication signal from an elevator controller that the door of the landing station where the elevator call-out device is located is opened or that the door of the elevator car is opened after arriving at the landing station where the elevator call-out device is located;

B2. causing the one of the visual signs, which corresponds to the direction of movement of the elevator car in which the elevator will move after stopping, to change alternately.

21. The method of claim 13, wherein step C comprises:

C1. receiving an indication signal from an elevator controller that the door of the elevator car or the door of the landing station where the elevator call-out device is located is closed;

C2. causing the one of the visual signs, which corresponds to the direction of movement of the elevator car in which the elevator car will move after stopping, to enter the off state.

22. The method of claim 13, wherein step A comprises:

A1. detecting whether the call-out button is pressed or whether an object hovers in its vicinity;

A2. if it is detected that the call-out button is pressed or the object hovers in its vicinity, the one of the visual signs, which corresponds to the direction of movement indicated by the call-out button, is caused to enter the normally lit state.

23. A non-transitory computer-readable storage medium having instructions stored in the non-transitory computer-readable storage medium, when the instructions are executed by a processor, the processor is caused to execute the method of claim 13.

* * * * *